United States Patent

Knowles

[15] 3,689,675

[45] Sept. 5, 1972

[54] IRRITANT COMPOSITION COMPRISING CERTAIN SUBSTITUTED FORMANIDINES

[72] Inventor: Richard N. Knowles, Hockessin, Del.

[73] Assignee: E. I. du Pont de Nemours and Company, Wilmington, Del.

[22] Filed: Oct. 24, 1968

[21] Appl. No.: 770,451

Related U.S. Application Data

[62] Division of Ser. No. 634,037, April 20, 1967.

[52] U.S. Cl................424/326, 260/564 R, 424/244, 424/267, 424/274

[51] Int. Cl............................A01n 9/20, A01n 9/22

[58] Field of Search.............424/326, 244, 267, 274; 260/564

[56] References Cited

UNITED STATES PATENTS 3,228,975 1/1966 Geldlum et al. ...........424/326

3,109,845 11/1963 Seeger et al. ..............424/274

*Primary Examiner*—Leland A. Sebastian

*Attorney*—Herbert W. Larson

[57] ABSTRACT

Repelling animals with cyclohexylformamidines of the formula:

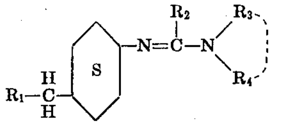

wherein $R_1$ is alkyl, cycloalkyl, bicycloalkyl, or tricycloalkyl, $R_2$ is hydrogen or alkyl, $R_3$ is alkyl, and $R_4$ is alkyl and can be joined with $R_3$ to form a saturated ring.

Typical is N,N-dimethyl-N'-(4-cyclohexylmethylcyclohexyl)-formamidine useful for repelling animals.

8 Claims, No Drawings

IRRITANT COMPOSITION COMPRISING CERTAIN SUBSTITUTED FORMANIDINES

CROSS REFERENCE

This application is a divisional of my copending application Ser. No. 634,037, filed Apr. 20, 1967.

BACKGROUND OF THE INVENTION

The following applications relate to compounds containing cyclohexyl ring structures and having utility as animal repellants:

Application Serial Nos.

532,544, filed March 1, 1966, now abandoned,
574,276, filed Aug. 18, 1966,
574,495, filed Aug. 18, 1966,
574,496, filed Aug. 18, 1966,
574,498, filed Aug. 18, 1966, and
574,499, filed Aug. 18, 1966.

I have now discovered an additional class of compounds containing a cyclohexyl ring structure and having utility as animal repellants.

SUMMARY OF THE INVENTION

I have discovered that animal repellant activity is shown by the following compounds:

(1)

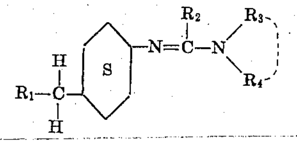

wherein

- $R_1$ is alkyl of three through eight carbon atoms, cycloalkyl of four through nine carbon atoms, cycloalkylalkyl of five through 10 carbon atoms, bicycloalkyl of seven through 10 carbon atoms or tricycloalkyl of 10 through 11 carbon atoms,
- $R_2$ is hydrogen or alkyl containing one through three carbon atoms,
- $R_3$ is alkyl containing one through four carbon atoms, and
- $R_4$ is alkyl containing one through four carbon atoms and can be joined with $R_3$ to form a saturated hydrocarbon ring.

The dotted line in formula 1 denotes those compounds where $R_3$ and $R_4$ are joined.

Preferred because of excellent animal irritant activity at low rates of application are those compounds of formula 1 wherein $R_2$ is hydrogen and $R_3$ and $R_4$ are not joined.

Particularly preferred because of outstanding animal irritant activity at low use rates are the cis and trans isomers of N,N-dimethyl-N'-(4-cyclohexylmethylcyclohexyl)formamidines.

UTILITY

Compounds of this invention cause potent irritation to animal tissue, particularly to the mucous membranes.

Animals exposed to the above compounds show signs of severe respiratory irritation. These compounds have two advantages over currently used riot control agents such as ortho-chlorobenzylidenemalonitrile (CS) and 2-chloroacetophenone (CN) as well as over currently used animal repellants such as dried blood for deer, allylisothiocyanate for dogs and zinc dithiocarbamateamine complex for rodents. One, the compounds are more potent at low concentrations and two, provide residual activity over longer periods of time.

Compounds of this invention and particularly cis/trans mixtures of N,N-dimethyl-N'-(4-cyclohexylmethylcyclohexyl)formamidine have potential use as riot control agents, dog repellants, deer repellants, rodent repellants and for contaminating caves or underground tunnels.

PREPARATION

The compounds of this invention are prepared by the reaction of an amine with an amide diethylacetal. This reaction is illustrated below. $R_1$, $R_{(}$, $R_3$, and $R_4$ are as defined in formula 1.

(I)

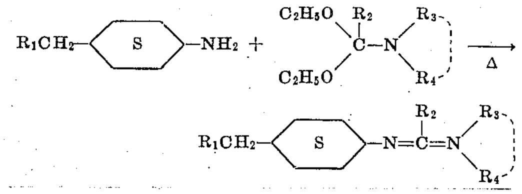

The amide diethylacetals and formamidines are prepared according to the method of H. Bredereck, F. Effenberger and G. Simchen; Angew. Chem., 73, 493 (1961).

The desired formamidine is prepared by refluxing an amine with the amide diethylacetal according to Reaction I for one to two hours, and then the solution is distilled. The first cut consists of ethanol; the formamidine is then distilled at reduced pressure. The amine intermediates can be prepared according to the following synthetic route.

$R_1$ is as defined in formula (1)

(II)

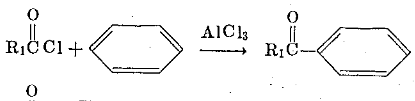

(III)

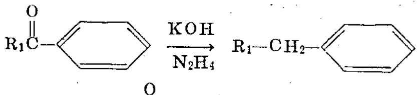

(IV)

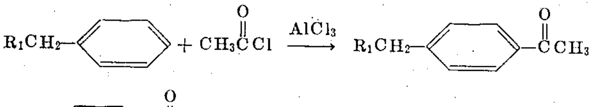

(V)

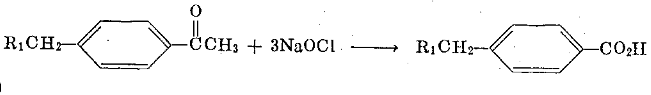

(VI)

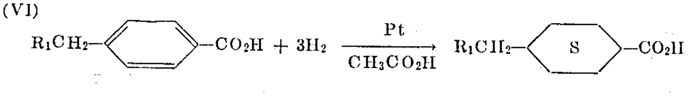

(VII)

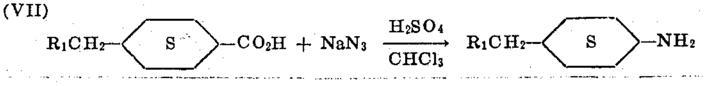

The Friedel Crafts reaction (II) is run by carefully adding the acid chloride to a stirring mixture of aluminum chloride in benzene. A slight molar excess of catalyst is used; benzene serves as both a solvent and reactant. The acid chloride is added at a rate so as to keep the temperature of the slurry at about 30°–40°C. The mixture is stirred for 1 additional hour after all of the acid chloride is added, and then water is slowly added to decompose the catalyst. Sufficient water is added so that all the solids are dissolved. The phenylalkyl ketone is isolated from the benzene solution and is purified by distillation.

The Wolff-Kishner reduction (III) is run in 2-(2-ethoxyethoxy)ethanol using a modification of the procedure given by J. Cason et al. in *Organic Synthesis*, Collective Volume IV, John Wiley and Sons, New York, (1963), p. 510. Once the reactants are mixed, they are heated to reflux for a period of 3 to 5 hours. The reflux temperature is generally in the 130°–140°C. range. After completion of the reflux period, the solution is cooled and poured into 3 to 4 volumes of water. The alkylbenzene product is extracted with pentane, and purified by distillation.

In those reactions where $R_1$ does not have a large molecular weight, such as cyclobutyl, the sodium benzoate derivative remains dissolved; however, when $R_1$ is of a larger molecular weight, such as n-octyl, the sodium benzoate derivative precipitates as a soapy solid. Sulfur dioxide is bubbled into the alkaline pot concentrate until the pH drops below 3. The precipitated benzoic acid derivative is either filtered and washed with water, or extracted with methylene chloride depending on whether or not the benzoic acid is easily filterable or is of a soapy nature. Some of these benzoic acid derivatives can be recrystallized from acetonitrile or pentane, and some are purified merely by trituration with cold pentane.

The catalytic hydrogenation (VI) is performed at 1 to 4 atmospheres of hydrogen using platinum oxide as catalyst and glacial acetic acid as solvent. A Parr Hydrogenation Apparatus is suitable for these reactions. This reaction produces a cis/trans isomer mixture of about 2 or 3 to 1. The cis and trans designation refers to the relationship of the 4-alkyl substituent and carboxylic acid group on the cyclohexane ring; this is illustrated below.

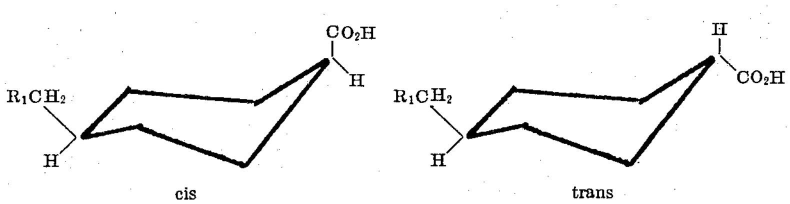

The Friedel-Crafts reaction (IV) is run by mixing approximately equimolar quantities of the reactants together in hexane or nitromethane at less than 5°C. The stirring mixture is slowly allowed to warm to room temperature, and after hydrogen chloride evolution subsides, the mixture is refluxed several hours. Water is then added slowly to decompose the catalyst. A sufficient quantity of water is then added so that all of the solids are dissolved. The desired acetophenone derivative is isolated from the organic phase and purified by distillation. Gas-liquid chromatography on an F & M Model 500 Gas Chromatograph using a 2 feet × ¼inches O.D. stainless steel column, containing 10 percent Carbowax 20M on 60–80 mesh Diatoport T indicates that about 98 percent of the acetophenone is the 1,4-isomer and 2 percent is the 1,2-isomer. The 1,2-isomer has the shorter retention time.

The haloform reaction (V) is run by slowly adding a cold (<5°C.) sodium hypochlorite solution to a stirring solution of the acetophenone derivative in methanol. This is a modification of the procedure used by E. E. Royals, "Journal American Chemical Society," Volume 69, p. 841 (1947), for the haloform reaction of α-ionone. After the sodium hypochlorite solution is added, the mixture is warmed to room temperature, and left standing over night. The mixture is heated to reflux, and the distillate collected until the pot temperature rises to 95°–97°C.; most of the methanol is distilled. The pot is then cooled to room temperature.

The Schmidt reaction (VII) is performed by dissolving the cyclohexane carboxylic acid derivative in a mixture of chloroform and concentrated sulfuric acid. Sodium azide is then added in small portions to the stirring mixture at a rate sufficient to keep the reaction temperature between 35° and 45°C. The mixture is stirred at about 45° to 50°C. until the bubbling nearly stops (1 to 3 hours). The mixture is then transferred to a separatory funnel, and the lower, gelatinous sulfuric acid layer is slowly dripped into ice. The amine sulfate precipitates as a soapy material which slowly crystallizes. The chloroform should be kept away from the ice water mixture since it makes the work-up much more difficult. Those amines which crystallize as the hemisulfates or sulfates are filtered and washed with water. It is convenient to store the amines as their salts. Those amine salts which fail to crystallize are converted to the free bases by making the sulfuric acid solution alkaline, and extracting the amine with dichloromethane. The amine is then purified by distillation. The Schmidt reaction proceeds without changing the cis/trans product ratio.

An alternative synthesis route for these amine intermediates can be used when the appropriately substituted aniline derivatives are available. This route is illustrated below.

(VIII)

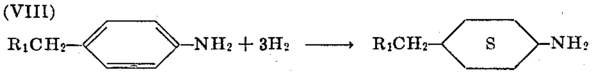

The hydrogenation (VIII) can be performed on a Parr Hydrogenation Apparatus using platinum oxide as catalyst and glacial acetic acid as solvent. The cis :trans ratio of the cyclohexylamine product is about 1:1

COMPOSITIONS

Compounds of this invention can be administered alone, but are generally contained in a composition with an inert diluent non-toxic to animals. The diluent selected depends on the route of administration.

Emulsifying agents can be used with the diluent and compound of formula 1 to aid in dispersion of the active ingredient. Emulsifying agents that could be used include alkylaryl polyethoxy alcohols, alkyl and alkylaryl polyether alcohols, polyoxyethylene sorbitol or sorbitan fatty esters, polyethylene glycol fatty esters, fatty alkylol amide condensates, amine salts of fatty alcohol sulfates plus long chain alcohols and oil soluble petroleum sulfonates.

The amount of emulsifying agent in the composition will range from 0.1 to 20 percent by weight.

Since the compounds of the present invention would generally be administered by vapor or spray application, the compositions will contain a liquid diluent such as water, acetone, hexane, gasoline, kerosene, other hydrocarbon oils, alcohols or other liquids generally used in pharmaceutical preparations.

The amount of active ingredient in the composition will vary from 0.005 percent by weight to 95 percent or even higher. The diluent will generally constitute the major proportion of the composition and the amount of active ingredient will be less than 50 percent by weight. The exact concentration of the active ingredient will depend on the mechanism used for administration and will be easily understood by one knowledgeable in pharmaceutical application rates.

APPLICATION

A quantity of active ingredient sufficient to cause irritation to animal tissue is 100 to 6,000 micrograms per liter of air at exposure of 1 minute. It is expected that this rate applies to all animals. Rates of over 6,000 micrograms per liter of air at exposure of one minute kill 50 percent of the mice which are treated.

The following additional examples are provided to more particularly explain the invention.

EXAMPLE 1

A solution of 10.6 g. (54m moles) of 4-cyclohexylmethylcyclohexylamine and 8.1 g. (55m mole) of dimethylformamide diethylacetal is refluxed for 1½ hours in a 50 ml. round bottom flask. The ethanol is then distilled; about 3.8 ml. of ethanol is collected. The oil remaining in the pot is then distilled in vacuum. The N,N-dimethylN'-(4-cyclohexylmethylcyclohexyl)formamidine boils at 123°C. at a pressure of 0.3 mm. of mercury ($n_D^{25}$ 1.5010).

Gas-liquid chromatography on an F & M Model 500 Gas Chromatograph using a 2 feet × ¼inches O.D. stainless steel column packed with 10 percent Carbowax 20M on 60–80 mesh Diatoport at a column temperature of 225°C., block temperature of 312°C., injection port temperature of 280°C., and a helium flow rate of 60 cc./min. separates the cis and trans isomers. The cis and trans isomers have retention times of 10.5 minutes and 13.0 minutes respectively and are present in the ratio of about 4 to 1.

Anal. Calc'd. for $C_{16}H_{30}N_2$: C, 76.7; H, 12.1; N, 11.2%.

Found: C, 76.6; H, 12.0; N, 11.3%.

Mice are treated by aerosol exposure to this cis/trans mixture of N,N-dimethyl-N'-(4-cyclohexylmethylcyclohexylformamidine in the following manner: The compound is administered as an aerosol into a 2.8 liter chamber. The exposure chamber consists of a 2.8 liter bell jar over a nebullizer inserted through the floor of the chamber. Mice are exposed for 5 minutes to 350 micrograms per liter of air (1,750 Ct). The compound is dissolved in 1.4 ml. of acetone and during a span of 20 seconds the compound is sprayed up into the chamber. No further air is transferred into or out of the chamber during the 5 minute exposure.

After this exposure, irritant effects are observed in all mice exposed, but not in controls exposed to 1.4 ml. of acetone alone. Irritant effects can be described as the presence of one or more of the following reactive signs:

a. abnormal gait, including rubbing of the nose on the floor while running about
b. depression
c. dyspnea.

EXAMPLES 2 — 15

The following compounds are made in a manner like that of N,N-dimethyl-N'-(4-cyclohexylmethylcyclohexyl)-formamidine of Example 1 by substituting a like amount by weight of the appropriate amine and amide diethylacetal for the 4-cyclohexylmethylcyclohexylamine and dimethylformamide diethylacetal of Example 1. They produce like irritant effects.

2. N,N-diethyl-N'-(4-n-hexylcyclohexyl)formamidine.
3. N,N-dipropyl-N'-[4-(2-[2.2.1]-bicycloheptylmethyl)-cyclohexyl]formamidine.
4. N,N-dibutyl-N'-[4-iso-butylcyclohexyl]formamidine.
5. N,N-dimethyl-N'-[4-cyclopentylmethylcyclohexyl]acetamidine.
6. N,N-dimethyl-N'-[4-(3-cyclopentylpropyl)cyclohexyl]-formamidine.
7. N,N-dimethyl-N'-[4-n-octylcyclohexyl]butyramidine.
8. N,N-dimethyl-N'-[4-(1-adamantylmethyl)cyclohexyl]formamidine.
9. N,N-pentamethylene-N'-(4-cyclobutylmethylcyclohexyl)-formamidine.
10. N,N-dimethyl-N'-(4-n-butylcyclohexyl)formamidine.
11. N,N-tetramethylene-N'-(4-cyclohexylmethylcyclohexyl)-formamidine.
12. N,N-dimethylene-N'-(4-n-hexylcyclohexyl)acetamidine.
13. N,N-octamethylene-N'-(4-n-butylcyclohexyl)formamidine.
14. N,N-dimethyl-N'-(4-[3-cyclopentylpropyl]cyclohexyl)-formamidine.
15. N-N-Dimethyl-N'-(4-cycloheptylmethyl)formamidine.

EXAMPLE 16

A 2 percent solution of N,N-dimethyl-N'-(4-cyclohexylmethylcyclohexyl)formamidine in dichloromethane is dispersed as an aerosol into and through a chamber containing young adult male guinea pigs weighing 250–300 grams. This aerosol is generated by feeding the solution of test compound through a commercial paint sprayer jet at the rate of 10 ml./min., and dispersing the spray with a stream of air having a flow rate of 44 liters/min. supplied at a pressure of 62 pounds/sq. inch. The efficiency of forming respirable particles ranges from 10 to 40 percent. This aerosol gives a concentration of N,N-dimethyl-N'-(4-cyclohexylmethylcyclohexyl)formamidine in the chamber of 2.1 mg./liter. The particles in the aerosol have a mass median diameter of 1.3 microns with a standard geometric deviation of 2.0 microns.

The guinea pigs exposed to this aerosol for one minute experienced dyspnea characterized by a cough-like spasm which lasts for 2 hours. The guinea pigs also tried to escape from the chamber and exhibited face pawing. No adverse effects are seen 24 hours after the exposure.

I claim:

1. An animal irritant composition comprising a major amount of an inert liquid diluent non-toxic to animals and an amount sufficient to cause irritation to animal tissue of a compound of the formula:

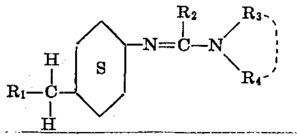

wherein $R_1$ is selected from the group consisting of alkyl of three through eight carbon atoms, cycloalkyl of four through nine carbon atoms, cycloalkylalkyl of five through 10 carbon atoms, bicycloalkyl of seven through 10 carbon atoms and tricycloalkyl of 10 through 11 carbon atoms, $R_2$ is selected from the group consisting of hydrogen and alkyl containing one through three carbon atoms, $R_3$ is alkyl containing one through four carbon atoms, and $R_4$ is alkyl containing one through four carbon atoms; and $R_3$ and $R_4$ can be joined to form a saturated hydrocarbon ring containing two through eight carbon atoms.

2. Method of repelling animals comprising applying to an area to be protected from animals in an amount sufficient to cause irritation to animal tissue, a compound of the formula:

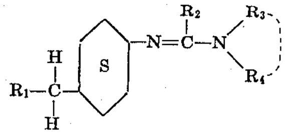

wherein $R_1$ is selected from the group consisting of alkyl of three through eight carbon atoms, cycloalkyl of four through nine carbon atoms, cycloalkylalkyl of five through 10 carbon atoms, bicycloalkyl of seven through 10 carbon atoms and tricycloalkyl of 10 through 11 carbon atoms, $R_2$ is selected from the group consisting of hydrogen and alkyl containing one through three carbon atoms, $R_3$ is alkyl containing one through four carbon atoms, and $R_4$ is alkyl containing one through four carbon atoms; and $R_3$ and $R_4$ can be joined to form a saturated hydrocarbon ring containing two through eight carbon atoms.

3. Method of repelling animals according to Claim 2 wherein $R_1$ in the compound applied is cyclohexyl.

4. Method of repelling animals according to Claim 2 wherein $R_2$ in the compound applied is hydrogen.

5. Method of repelling animals according to Claim 2 wherein $R_3$ and $R_4$ are both methyl in the compound applied.

6. Method of repelling animals according to Claim 2 wherein $R_1$ is cyclohexyl and $R_2$ is hydrogen in the compound applied.

7. Method of repelling animals comprising applying to an area to be protected from animals in an amount sufficient to cause irritation to animal tissue, N,N-dimethyl-N'-(4-cyclohexylmethylcyclohexyl)formamidine.

8. Method of repelling animals comprising applying to an area to be protected from animals in an amount sufficient to cause irritation to animal tissue, N,N-dimethyl-N'-(4-n-butylcyclohexyl)formamidine.

* * * * *